United States Patent
Stabrawa et al.

(10) Patent No.: US 9,015,426 B2
(45) Date of Patent: Apr. 21, 2015

(54) HIGH PERFORMANCE DATA STORAGE USING OBSERVABLE CLIENT-SIDE MEMORY ACCESS

(75) Inventors: Timothy A. Stabrawa, Wauwatosa, WI (US); Andrew S. Poling, Naperville, IL (US); Zachary A. Cornelius, Chicago, IL (US); John K. Overton, Chicago, IL (US)

(73) Assignee: Kove Corporation, Chicago, IL (US)

( * ) Notice: Subject to any disclaimer, the term of this patent is extended or adjusted under 35 U.S.C. 154(b) by 406 days.

(21) Appl. No.: 13/036,544

(22) Filed: Feb. 28, 2011

(65) Prior Publication Data

US 2012/0221803 A1     Aug. 30, 2012

(51) Int. Cl.
    *G06F 3/06*            (2006.01)
    *G06F 11/30*         (2006.01)
    *G06F 15/173*       (2006.01)

(52) U.S. Cl.
CPC .......... *G06F 3/0659* (2013.01); *G06F 11/3037* (2013.01); *G06F 3/0665* (2013.01); *G06F 15/17331* (2013.01); *G06F 3/067* (2013.01); *G06F 3/0611* (2013.01); *G06F 3/0676* (2013.01)

(58) Field of Classification Search
None
See application file for complete search history.

(56) References Cited

U.S. PATENT DOCUMENTS

| | | | |
|---|---|---|---|
| 6,684,270 B1 * | 1/2004 | Chmara et al. | 710/38 |
| 7,809,868 B1 * | 10/2010 | Mu | 710/74 |
| 8,055,613 B1 * | 11/2011 | Mu et al. | 707/610 |
| 2004/0093389 A1 * | 5/2004 | Mohamed et al. | 709/212 |
| 2005/0071436 A1 * | 3/2005 | Hsu et al. | 709/212 |
| 2005/0080946 A1 * | 4/2005 | Hosoya | 710/33 |
| 2005/0216552 A1 * | 9/2005 | Fineberg et al. | 709/203 |
| 2006/0262796 A1 * | 11/2006 | Biran et al. | 370/392 |
| 2007/0011276 A1 * | 1/2007 | Sharma et al. | 709/218 |
| 2007/0266037 A1 * | 11/2007 | Terry et al. | 707/100 |
| 2008/0147822 A1 * | 6/2008 | Benhase et al. | 709/217 |
| 2008/0177803 A1 * | 7/2008 | Fineberg et al. | 707/202 |
| 2009/0292861 A1 * | 11/2009 | Kanevsky et al. | 711/103 |
| 2010/0228919 A1 | 9/2010 | Stabrawa et al. | 711/120 |
| 2011/0246597 A1 * | 10/2011 | Swanson et al. | 709/212 |
| 2011/0283046 A1 * | 11/2011 | Koseki | 711/103 |
| 2014/0089562 A1 * | 3/2014 | Deguchi et al. | 711/103 |

FOREIGN PATENT DOCUMENTS

WO    WO 2009/143381 A2    11/2009            G06F 15/17

OTHER PUBLICATIONS

Hasan Abbasi et al. "DataStager: Scalable Data Staging Services for Petascale Applications." Jun. 2009. ACM. HPDC '09. pp. 39-48.*

(Continued)

*Primary Examiner* — Nathan Sadler
(74) *Attorney, Agent, or Firm* — Brinks Gilson & Lione

(57) ABSTRACT

In one example, a system is provided that performs memory access operations on a storage volume stored in memory and identifies the memory access operations performed. A request to perform a memory access operation may be received at a communication interface. The request may comply with a memory access protocol. The memory access operation may be performed on a portion of the memory in response to the request, where the portion of the memory is included in the storage volume. One or more attributes of the memory access operation may be identified. An action related to the memory access operation may be performed based on the attribute of the memory access operation.

20 Claims, 3 Drawing Sheets

Storage System 100

(56) References Cited

OTHER PUBLICATIONS

Debian OFED Infiniband Packaging, downloaded Feb. 28, 2011, pp. 1-2, Debian, available at http://pkg-ofed.alioth.debian.org.

Infiniband, downloaded Feb. 28, 2011, pp. 1-5, Wikipedia, available at http://en.wikipedia.org/wiki/Infiniband.

RNA-Memory Store, downloaded Feb. 28, 2011, RNA Networks, available at www.rnanetworks.com/memory-store.

SCST: Contributing to SCST, downloaded Feb. 28, 2011, pp. 1-4, SourceForge, available at http://scst.sourceforge.net/contributing.html.

SCST: Generic SCSI Target Subsystem for Linux, downloaded Feb. 28, 2011, pp. 1-2, SourceForge, available at http://scst.sourceforge.net.

Texas Memory Systems: RamSan 300, downloaded Feb. 28, 2011, pp. 1-2, TMS, available at http://www.ramsan.com/products/43.

The OpenFabrics Alliance—Open-Source Software Stack for Linux and Windows, downloaded Feb. 28, 2011, pp. 1-2, OpenFabrics Alliance, available at http://www.openfabrics.org.

Extended European Search Report, dated Jun. 1, 2012, pp. 1-7, European Patent Application No. 12000725.7, European Patent Office, The Netherlands.

European Office Action dated Apr. 29, pp. 1-7, European Patent Application No. 12000725.7, European Patent Office, The Netherlands.

T10: "Information Technology—SCSI RDMA Protocol (SRP)", Jul. 3, 2002, pp. 1-83, Retrieved from the Internet: URL: http://www.csit-sun.pub.ro/~cpop/Documentatie_SM/Standarde_magistrale/SCSI/srp-r16a.pdf [retrieved on Apr. 23, 2013].

European Office Action dated Apr. 29, 2013, pp. 1-7, European Patent Application No. 12000725.7, European Patent Office, The Netherlands.

\* cited by examiner

HIGH PERFORMANCE DATA STORAGE USING OBSERVABLE CLIENT-SIDE MEMORY ACCESS

BACKGROUND

1. Technical Field

This application relates to data storage and, in particular, to high performance data storage.

2. Related Art

A common storage protocol, SCSI (Small Computer System Interface), operates using a request/response model. To execute a read transaction, a SCSI initiator, such as a client machine, uses a physical interconnect to send an encoded buffer to a SCSI target, such as a storage device, indicating which storage block or storage blocks to read. The SCSI target then retrieves the requested data and responds with the result of the read operation. To execute a write request, the SCSI initiator uses the physical interconnect to send an encoded buffer to the SCSI target indicating which block or blocks to write. Once the associated data has been sent from the initiator to the target and the target has stored the data, the target responds with the result of the write operation.

The processing of SCSI's encoded read/write requests, along with any underlying protocol or protocols, can place significant demand on computational resources of the client machine and the storage device as the number of requested operations per second increases. Depending on the underlying physical interconnect and/or protocols, the transfer of read and/or write data may be managed by the initiator, the target, or both.

SUMMARY

In order to improve the speed of access to a storage volume, a system may be provided that identifies and performs memory access operations on memory that includes a storage volume. The system may include a communication interface, the memory that includes the storage volume, and observer logic that identifies the memory access operations. The communication interface may receive a request to perform a memory access operation on the memory, where the request is compliant with a memory access protocol, such as Remote Direct Memory Access (RDMA). The communication interface may perform the memory access operation on a portion of the memory in response to the request. The portion of the memory may be included in a storage volume stored in the memory. The observer logic may identify one or more attributes of the memory access operation and, in response, perform an action related to the memory access operation, such as copying the portion of the memory to a backing store.

A computer-readable storage medium may be provided to improve the speed of access to a storage volume. Instructions encoded thereon, when executed, may identify one or more attributes of a memory access operation. The memory access operation may be performed on a storage volume in response to receiving, at a communication interface, a request to perform the memory access operation. The request may be compliant with a memory access protocol. The storage volume may be included in the memory of a storage device. Instructions encoded on the computer-readable medium, when executed, may perform an action related to the memory access operation based on the attribute or attributes of the memory access operation.

A method may be provided that identifies memory access operations performed on memory that includes a storage volume. A request to perform a memory access operation on the memory may be received at a communication interface. The request may be compliant with a memory access protocol. The memory access operation may be performed on a portion of the memory in response to the request. The portion of the memory may be included in the storage volume. One or more attributes of the memory access operation may be identified. An action related to the memory access operation may be performed based on an identification of the attribute or attributes of the memory access operation.

Further objects and advantages of the present invention will be apparent from the following description, reference being made to the accompanying drawings wherein preferred embodiments of the present invention are shown.

BRIEF DESCRIPTION OF THE DRAWINGS

The embodiments may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION

Figure 1:
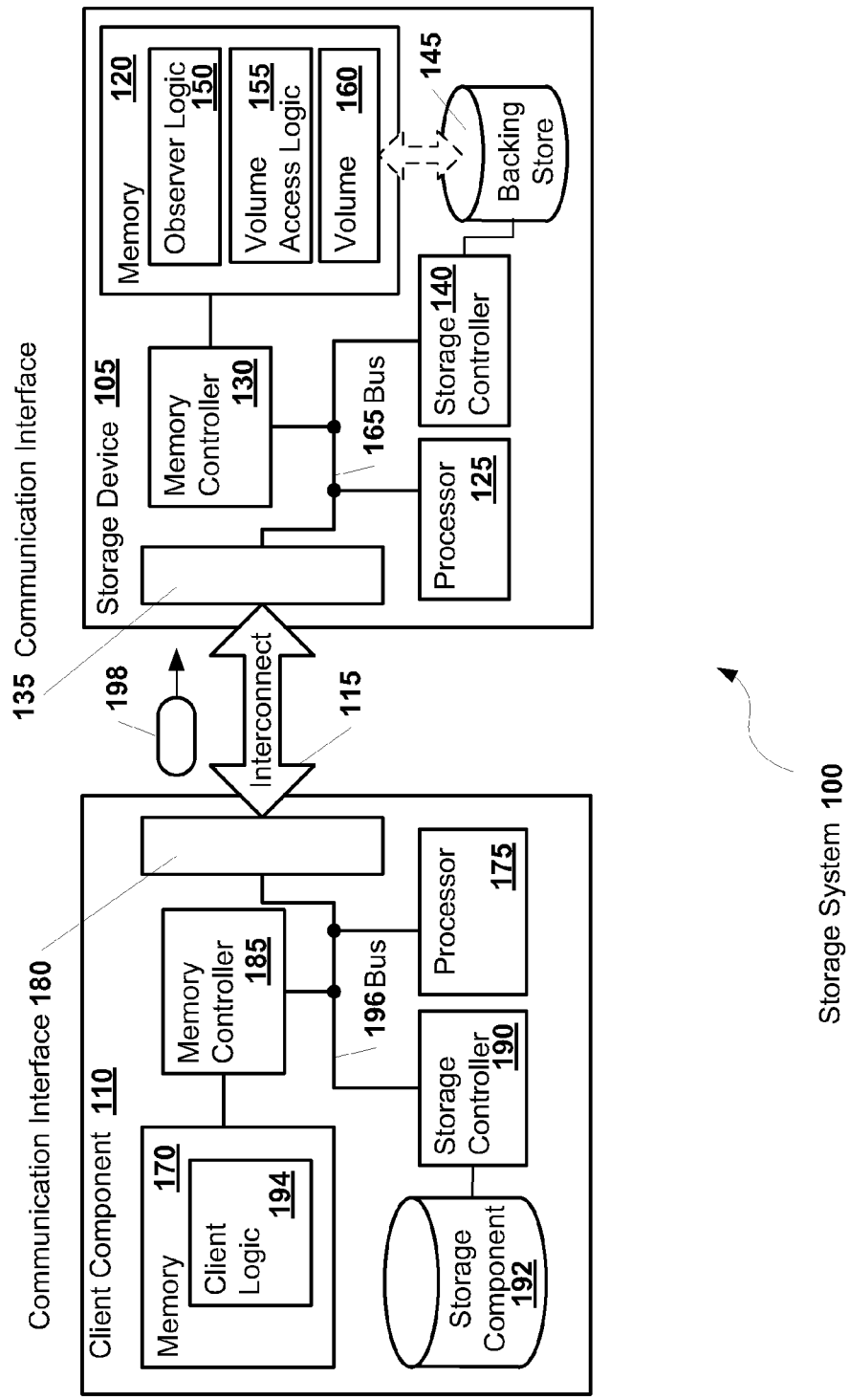
FIG. 1 illustrates a hardware diagram of an example high performance data storage system.

By way of an example, a system for high performance data storage may store all data of a storage volume in a memory of a storage device. Volume access logic in the storage device may register the storage volume—or memory regions associated with the storage volume—with one or more communication interfaces in the storage device. Alternatively, or in addition, the volume access logic may provide and/or control access to the storage volume by one or more client components. A communication interface in the client component may provide client-side memory access to the memory, to regions within the memory, and/or to the storage volume in the storage device. An interconnect or network may transport data between the communication interface of the client component and the communication interface of the storage device. For example, the communication interfaces may be network interface controllers.

Client-side memory access may bypass a processor at the client component and/or may otherwise facilitate the client component accessing the memory on the storage device without waiting for an action by a processor included in the client component, in the storage device, or both. For example, the client-side memory access may be based on the Remote Direct Memory Access (RDMA) protocol. The communication interfaces may provide reliable delivery of messages and/or reliable execution of memory access operations, such as any memory access operation carried out when performing the client-side memory access. Alternatively, or in addition, delivery of messages and/or execution of memory access operations may be unreliable, such as when data is transported between the communication interfaces using the User Datagram Protocol (UDP). The client component may read, write, and/or perform other operations on the memory, regions within the memory, and/or the storage volume in the storage device using client-side memory access. In providing client-side memory access, the client component may transmit requests to perform memory access operations to the storage device. In response, the storage device may perform the memory access operations. The storage device may observe or otherwise identify the memory access operations. In response to identifying the memory access operations, the storage device may, for example, copy the data of the storage volume to one or more optional backing stores independently of performing the memory access operations on the memory. A backing store may include one or more persistent non-volatile storage media, such as flash memory, phase change memory, memristors, EEPROM, magnetic disk, tape, or some other media. The memory and/or the backing store (if included) may be subdivided into storage volumes.

One technical advantage of the storage system may be that the storage system may provide DMA-equivalent performance for read and write operations using a memory access protocol, yet still identify the memory access operations performed. Accordingly, the storage system may take further action based on information about the memory access operations. For example, further action may include aggregating statistics about the memory access operations, tracking regions of the memory that have been written, persisting contents of the regions to a backing store, duplicating the contents of the regions to a backup storage volume or other storage device, and/or any other action related to the memory access operations. In one or more examples, duplicating the contents of updated regions of memory may be accomplished using techniques described in U.S. patent application Ser. No. 12/712,884, entitled SYSTEM AND METHOD FOR RAPID DATA SNAPSHOTS, filed Feb. 25, 2010. Thus, the storage system may rapidly store information in the storage volume using memory access operations handled primarily by interconnect hardware, and still ensure that the stored information is persisted in the event of a power loss and/or system shutdown.

FIG. 1 illustrates a hardware diagram of an example high performance data storage system 100. The storage system 100 may include a storage device 105 and a client component 110. The storage system 100 may include more, fewer, or different elements. For example, the storage system 100 may include a plurality of client devices, a plurality of storage devices, or both. Alternatively, the storage system 100 may include just the storage device 105.

The client component 110 and the storage device 105 may communicate with each other over an interconnect 115. The communication may be unidirectional or bi-directional. In one example, the interconnect 115 may electrically couple the storage device 105 and client component 110.

The interconnect 115 may include any physical component that transports signals between two or more devices. Examples of the interconnect 115 include a wire, a parallel bus, a serial bus, a network, a switched fabric, a wireless link, or a combination of multiple components that transport signals between devices. Alternatively or in addition, the client component 110 may communicate with the storage device 105 over a network or switched fabric, such as a Storage Area Network (SAN), an INFINIBAND® network, which is a registered trademark owned by System I/O Inc. of Beaverton Oreg., a Local Area Network (LAN), a Wireless Local Area Network (WLAN), a Personal Area Network (PAN), a Wide Area Network (WAN), or any other now known or later developed communications network.

The storage device 105 may store data received over the interconnect 115. The storage device 105 may include a memory 120, a processor 125, a memory controller 130, and a communication interface 135. The storage device 105 may include more, fewer, or different elements. For example, the storage device 105 may include a backing store 145, a storage controller 140, multiple backing stores, multiple storage controllers, or any combination thereof. The storage device 105 may be powered by a single power source, or by multiple power sources. Examples of the power source include a public utility, internal or external battery, an Uninterruptible Power Supply (UPS), a facility UPS, a generator, a solar panel, any other power source, or a combination of power sources. The storage device 105 may detect a condition of one or more of power sources that power the storage device.

The memory 120 may be any memory or combination of memories, such as a solid state memory, a random access memory (RAM), a dynamic random access memory (DRAM), a static random access memory (SRAM), a flash memory, a read-only memory (ROM), an electrically erasable programmable read-only memory (EEPROM), a flash memory, a phase change memory, a memrister memory, any type of memory configured in an address space addressable by the processor 125, or any combination thereof. The memory 120 may be volatile or non-volatile, or a combination of both.

The memory 120 may include an observer logic 150, a volume access logic 155, and a storage volume 160. In one implementation, each portion of the memory 120 that includes a corresponding one of the observer logic 150, the volume access logic 155, and the storage volume 160 may be of a different type than the other portions of the memory 120. For example, the memory 120 may include a ROM and a solid state memory, where the ROM includes the observer logic 150 and volume access logic 155, and the solid state memory includes the storage volume 160. The memory 120 may be controlled by the memory controller 130. The memory 120 may include more, fewer, or different components.

The processor 125 may be a general processor, a central processing unit, a server, a microcontroller, an application specific integrated circuit (ASIC), a digital signal processor, a field programmable gate array (FPGA), a digital circuit, an analog circuit, or any combination thereof. The processor 125 may include one or more devices operable to execute computer executable instructions or computer code embodied in the memory 120 or in other memory to perform features of the storage system 100. For example, the processor 125 may execute computer executable instructions that are included in the observer logic 150 and the volume access logic 155.

The processor 125, the memory controller 130, and the communication interface 135 may each be in communication with each other. Each one of the processor 125, the memory controller 130, and the communication interface 135 may also be in communication with additional components, such as the storage controller 140, and the backing store 145. The communication between the components 120, 125, 130, 135, 140, and 145 of the storage device 105 may be over a bus 165, a point-to-point connection, a switched fabric, a network, any other type of interconnect, or any combination of interconnects. The communication may use any type of topology, including but not limited to a star, a mesh, a hypercube, a ring, a torus, or any other type topology known now or later discovered. Alternatively or in addition, any of the processor 125, the memory 120, the memory controller 130, and/or the communication interface 135 may be logically or physically combined with each other or with other components, such as with the storage controller 140, and/or the backing store 145.

The memory controller 130 may include a hardware component that translates memory addresses specified by the processor 125 into the appropriate signaling to access corresponding locations in the memory 120. The processor 125 may specify the address on the bus 165. The processor 125, the bus 165, and the memory 120 may be directly or indirectly coupled to a common circuit board, such as a motherboard. In one example, the bus 165 may include an address bus that is used to specify a physical address, where the address bus includes a series of lines connecting two or more components. The memory controller 130 may, for example, also perform background processing tasks, such as periodically refreshing the contents of the memory 120. In one example implementation, the memory controller 130 may be included in the processor 125.

The communication interface 135 may include any physical interconnect used for data transfer. In particular, the communication interface 135 may facilitate communication between the storage device 105 and the client component 110, or between the storage device 105 and any other device. The communication interface 135 may communicate via the interconnect 115. The communication interface 135 may include a hardware component. In addition, the communication interface 135 may include a software component. Examples of the communication interface 135 include a Direct Memory Access (DMA) controller, an RDMA controller, a Network Interface Controller (NIC), an Ethernet controller, a Fibre Channel interface, an INFINIBAND®, which is a registered trademark of System I/O, Inc. of Beaverton, Oreg., interface, a SATA interface, a SCSI interface, a Universal Serial Bus (USB) interface, an Ethernet interface, or any other physical communications interface. The communication interface 135 may facilitate client-side memory access, as described below.

The storage volume 160 may be a configured area of storage that is accessible via any memory access protocol and/or storage protocol now known or later discovered. Storage protocols and memory access protocols are described in detail below. The storage volume 160 may be a physical volume which maps a sequence of data blocks to corresponding memory locations in the memory 120. Therefore, in addition to the data blocks themselves, the storage volume 160 may include volume information, such as a mapping of data blocks to memory locations or any other information about the data blocks. The data blocks of the storage volume 160, which may be configured by the volume access logic 155, may all be stored in the memory 120. The volume information may or may not be included in the memory 120. Accordingly, when the storage volume 160 is said to be included in the memory 120, at least the data blocks of the storage volume 160 (the data stored in the storage volume 160) are included in the memory 120.

As indicated above, the storage volume 160 may be included in solid state memory. Solid state memory may include a device, or a combination of devices, that stores data, is constructed primarily from electrical conductors, semiconductors and insulators, and is considered not to have any moving mechanical parts. Solid state memory may be byte-addressable, word-addressable or block-addressable. For example, most dynamic RAM and some flash RAM may be byte-addressable or word-addressable. Flash RAM and other persistent types of RAM may be block-addressable. Solid state memory may be designed to connect to a memory controller, such as the memory controller 130 in the storage device 105, via a data bus, such as the bus 165 in the storage device 105.

Solid state memory may include random access memory that permits stored data to be read and/or written in any order (i.e., at random). The term "random" refers to the fact that any piece of data may be returned and/or written within a constant time period, regardless of the physical location of the data and regardless of whether the data is related to a previously read or written piece of data. In contrast, storage devices such as magnetic or optical discs rely on the physical movement of the recording medium or a read/write head so that retrieval time varies based on the physical location of the next item read and write time varies based on the physical location of the next item written. Examples of solid state memory include, but are not limited to: DRAM, SRAM, NAND flash RAM, NOR flash RAM, Phase Change Memory (PRAM), EEPROM, FeRAM, MRAM, CBRAM, PRAM, SONOS, RRAM, Racetrack memory, NRAM, Millipede, T-RAM, Z-Ram, and TTRAM.

In contrast to solid state memory, solid state storage devices are systems or devices that package solid state memory with a specialized storage controller through which the packaged solid state memory may be accessed using a hardware interconnect that conforms to a standardized storage hardware interface. For example, solid state storage devices include, but are not limited to: flash memory drives that include SATA or SCSI interfaces, Flash or DRAM drives that include SCSI over Fibre Channel interfaces, DRAM drives that include SATA or SCSI interfaces, and USB (universal serial bus) flash drives with USB interfaces.

The storage controller 140 may include a component that facilitates storage operations to be performed on the backing store 145. A storage operation may include reading from or writing to locations within the backing store 145. The storage controller 140 may include a hardware component. Alternatively or in addition, the storage controller 140 may include a software component.

The backing store 145 may include an area of storage comprising one or more persistent media, including but not limited to flash memory, Phase Change Memory, Memristors, EEPROM, magnetic disk, tape, other media, etc. The backing store 145 may be internal to the storage device 105, part of another storage device, part of a server, part of backup device, a storage device on a Storage Area Network, or some other externally attached persistent storage. The media in the backing store 145 may potentially be slower than the memory 120 on which the storage volume 160 is stored. The backing store 145 and/or the storage controller 140 may be internal to the storage device 105, a physically discrete component external to the storage device 105 and coupled thereto, and/or included in a second storage device or in a device different from the storage device 105.

The client component 110 may include a device that reads from, and writes to, the storage device 105. Examples of the client component 110 may include a computer, a server, a blade server, a desktop computer, a tablet computer, a laptop, a storage device, any other type of computing device, or a process that is executable by a processor.

The client component 110 may include a memory 170, a processor 175, a communication interface 180, and a memory controller 185, such as the memory 120, the processor 125, the communication interface 135, and the memory controller 130 of the storage device 135. The client component 110 may include more, fewer, or different components. For example, the client component 110 may include a storage controller 190, a storage component 192, multiple storage controllers, multiple storage components, or any combination thereof. Alternatively, the client component 110 may just include a process executed by the processor 175.

The storage controller 190 and/or storage component 192 may be internal to the client component 110, a discrete device external to the client component 110 that is coupled to the client component 110, and/or included in a device other than the client component 110, such as the storage device 105. The memory 170 of the client component 110 may include client logic 194. The processor 175 may execute computer executable instructions that are included in the client logic 194. The components 170, 175, 180, 185, 190, and 192 of the client component 110 may be in communication with each other over a bus 196, such as the bus 165 in the storage device 105 or over any other type of interconnect.

During operation of the storage system 100, the volume access logic 155 may provide the client component 110 with client-side memory access to the storage volume 160. Client-side memory access may include at least one memory access operation. A memory access operation may include, for example, a read memory operation or a write memory operation. The memory access operation may be performed by the storage device 105 in response to receiving a request 198 from the client component 110 at the communication interface 135 of the storage device 105. The request 198 may include, for example, a starting memory offset, a size of memory, a starting memory location, a number of units of memory to access, or any other attribute relating to the requested memory access operation. The request 198 may address the memory 120 on a block-addressable basis, a word-addressable basis, a byte-addressable basis, or any on any other suitable unit of memory basis. The volume access logic 155 may register the storage volume 160 with the communication interface 135 and/or with a device other than the storage device 105, such as with the client component 110. Alternatively or in addition, the volume access logic 155 may determine a location or locations in the memory 120 of the storage device 105 where the storage volume 160 is located. The volume access logic 155 may register the location or locations with the communication interface 135 and/or with a device other than the storage device 105, such as with the client component 110.

The volume access logic 155 may control and/or specify how the storage volume 160 may be accessed. For example, the volume access logic 116 may control which volumes are available on the storage device 105 and/or which operations may be performed. In one example, the volume access logic 155 may control access based upon the current time, day, month or year; an identity or a location of the communication interface 135, an identity or a location of the client component 110; or some other attribute of the client component 110, the storage device 105, the interconnect 115, or of the surrounding environment that is detectable by the volume access logic 155, such as the condition of the power source that powers the storage device 105. Alternatively or in addition, the volume access logic 116 may control access based on an authentication mechanism, including but not limited to a password, a key, biometrics, or a cryptographic authentication.

The volume access logic 155 or the communication interface 135 may provide client-side memory access using any memory access protocol now known or later discovered. The memory access protocol may be any communication protocol used to transfer data between a memory in a first device, such as the memory 170 in the client component 110, and a memory in a second device, such as the memory 120 in the storage device 105, where the data is transferred independently of central processing units (CPU) in the first and second devices, such as the processor 175 in the client component 110 and the processor 125 in the storage device 105. Therefore, in examples where the first device includes an operating system, the data may be transferred from the memory of the first device to the memory of the second device without involvement of the operating system. Although instructions executed by the CPU may direct a hardware data controller to transfer the data from the memory of the first device to the memory of the second device, the actual transfer of the data between the memories may be completed without involvement of the CPU and, if the first device includes an operating system, without involvement of the operating system. The memory access protocol may describe, for example, a format of the request 198 for the memory access operation to be performed on the memory in the second device or system.

The memory access protocol may be implemented, for example, using one or more hardware controllers, such as the communication interface 135 in the storage device 105 and the communication interface 180 in the client component 110. The memory access protocol and electrical characteristics of the hardware controller may be part of a common standard. Accordingly, the memory access protocol and electrical characteristics of the communication interface 135 or 180 may be part of one standard. In one example, the access protocol may be the RDMA protocol implemented in the communication interfaces 135 and 180, where the memory access protocol and the communication interfaces 135 and 180 conform to an INFINIBAND® standard. In a second example, the memory access protocol may be Internet Wide Area RDMA Protocol (iWARP), where iWARP is implemented in the communication interfaces 135 and 180, and where the communication interfaces 135 and 180 conform to iWARP and Ethernet standards. The iWARP standard, which is an Internet Engineering Task Force (IETF) protocol, is RDMA over TCP (Transport Control Protocol). In a third example, the memory access protocol may be a PCI bus-mastering protocol implemented in the communication interfaces 135 and 180, where the communication interfaces 135 and 180 conform to a PCI (Peripheral Component Interconnect) standard. The memory access protocol, such as RDMA, may be layered directly over a transport protocol, such as TCP.

In one or more examples, the volume access logic 155 may additionally provide block-level access to the storage volume 160 using any storage protocol now known or later discovered. A storage protocol may be any communications protocol used to transfer data between a block storage device or system, such as the storage device 105, and a device or system, such as the client component 110, that stores data in, and/or retrieves data from, the block storage device or system. A storage protocol may be implemented, for example, using one or more software and/or hardware storage controllers. The storage protocol and electrical characteristics of the hardware storage controller may be part of a common standard. In one example, the storage protocol may be the universal serial bus mass storage device class (USB MSC or UMS), which is a set of computing communications protocols defined by the USB Implementers Forum that runs on a hardware bus, such as the interconnect 115, that conforms to the USB standard. In a second example, the storage protocol may be the SCSI command protocol. In a third example, the storage protocol may be the SATA protocol. Additional examples of the storage protocol include Serial Attached SCSI (SAS) and Internet Small Computer System Interface (iSCSI). Alternatively or in addition, the volume access logic 155 may provide block-level access using any storage protocol that transfers data with a data transfer protocol, such as SCSI over Fibre Channel, SCSI RDMA Protocol (SRP) over Remote Direct Memory Access (RDMA), iSCSI over TCP/IP, or any other combination of storage protocol and data transfer protocol known now or discovered in the future.

Accessing the storage volume 160 using the storage protocol may be slower than accessing the storage volume 160 using the memory access protocol. In contrast to the memory access protocol, a CPU of the client component 110 may interact with the storage controller during the transfer of data to the block storage device or system, where the storage controller implements the storage protocol. Therefore, the storage protocol is different from the memory access protocol.

By providing block-addressable client-side memory access and/or block-level access through the volume access logic 155, the storage device 105 may be considered, in at least one example implementation, a block storage device. A block storage device may also be referred to as a block device. A block device stores data in blocks of a predetermined size, such as 512 or 1024 bytes. The predetermined size may be configurable. A block device is accessed via a software and/or hardware storage controller and/or a communication interface, such as the communication interface 180. Examples of other block devices include a disk drive having a spinning disk, a tape drive, a floppy disk drive, and a USB flash pen drive.

The volume access logic 155 may subdivide the memory 120, and/or the backing store 145 into one or more volumes. Each one of the volumes, such as the storage volume 160 in the memory 120 of the storage device 105, may be a configured area of storage that is accessible via any access protocol and/or storage protocol. Access protocols and storage protocols are described above.

The backing store 145 and/or the storage component 192 may include any block device. Examples of block devices may include, but are not limited to, hard disks, CD-ROM drives, tape drives, solid state storage devices, flash drives, or any other mass storage device.

The client logic 194 may perform memory access operations on the storage volume 160 in the memory 120 of the storage device 105 using client-side memory access over the memory access protocol. Alternatively or in addition, the client logic 194 may perform operations to discover the storage device 105 when connected, or to discover available volumes that may be accessible on the storage device 105. Alternatively or in addition, the client logic 194 may perform administration operations to modify attributes or metadata associated with the storage volume 160. In one example, the client logic 194 may perform an administration operation to set a human readable label associated with the storage volume 160. In a second example, the client logic 194 may perform an administration operation to change the operations that are available to the client component 110 or to other client components. The administration operations may be used, for example, to coordinate shared access to the storage volume 160 by multiple clients.

The client logic 194 may perform operations that communicate information to the observer logic 150 about a set of one or more memory access operations that were requested or that are to be requested by the client logic 194. For example, the client logic 194 may transmit a notification message via the communication interface 180 of the client component 110. The observer logic 150 may receive the notification message via the communication interface 135 of the storage device 105. The notification message may precede or follow the set of memory access operations requested by the client logic 194. The notification message may identify attributes of the set of memory access operations. Alternatively or in addition, the client logic 194 may perform memory access operations that are directly observable or identified by the observer logic 150. For example, the request 198 to perform the memory access operation may include notification information, such as an RDMA write with immediate value operation. In addition to writing to the memory 120 in the storage volume 160, the write with immediate value operation may cause the observer logic 150 to receive a notification that includes the immediate value specified by the client logic 194 in the RDMA write with immediate value. The value may include one or more attributes of the memory access operation. For example, the value may indicate what portion of the memory 120 is written to during the RDMA write with immediate value operation. Alternatively or in addition, the client logic 194 may perform operations that create a condition at the storage device 105 that the observer logic 150 can check for. For example, the client logic 194 may perform a client-side memory access operation to store information about a set of memory access operations in a particular region of the memory 120 on the storage device 105. The information stored in the region may include, for example, the offset, size, and/or type of each memory access operation performed. The observer logic 150 may check the region for updates in order to identify one or more attributes of the memory access operations.

The client logic 194 may be combined with any other logic that may use the capabilities of the client logic 194. In one example, the client logic 194 may implement an application programming interface (API), which application logic, such as a database server, may invoke in order to perform application-specific operations on the storage volume 160. In a second example, the client logic 194 may include a device driver that provides a block-level API that application logic may invoke in order to perform block operations on the storage volume 160. In a third example, the client logic 194 may be implemented as a circuit that provides a register-level and/or a memory-mapped interface with which application logic may communicate in order to perform operations on the storage volume 160. Examples of the application logic may include a program that a user interacts with, an operating system, a device driver, a file system, a state machine, a database, or any other logic that performs operations on the storage volume 160 using the client logic 194.

The observer logic 150 may observe or otherwise identify the operations requested by the client logic 194 that are performed on the storage volume 160 and/or the storage device 105. The observer logic 150 may identify the requested operations based on direct communication between the client component 110 and/or storage device 105. For example, the observer logic 150 may listen for incoming notification messages received from the client logic 194 at the communication interface 135. Alternatively, or in addition, the observer logic 150 may passively monitor the operations requested by the client component 110. For example, the observer logic 150 may listen for notification messages received as a result of operations performed by the client logic 194. Alternatively, or in addition, the observer logic 150 may check for conditions created by the client logic 194, the communication interface 135, or another hardware component. For example, the observer logic 150 may read contents of one or more regions of the memory 120 that are accessible by the client component 110 using client-side memory access, by the communication interface 135, or by another hardware component. For example, a memory region may include one or more flags that indicate whether one or more portions of the memory 120 have been updated by the memory access operations since the one or more portions of the memory 120 were last copied to the backing store 145.

In response to identifying a set of memory access operations, the observer logic 150 may take further action. In one example, further action may include determining statistics related to the memory access operations (including but not limited to the type of operation, the number of operations, the size of the affected memory, and/or memory locations of each operation). In a second example, further action may include tracking or identifying regions of the memory 120 that have been written to or otherwise affected by the memory access operations. The observer logic 150 may persist the contents of the affected regions of the memory 120 to the backing store 145, backing stores, and/or duplicate the contents of the affected regions of the memory 120 to a block device, an external server, and/or a backup device. Alternatively, the observer logic 150 may take any other action related to the memory access operations.

The memory access operation may complete at the storage device 105 without waiting for the observer logic 150 to identify the memory access operation. Alternatively or in addition, the memory access operation may complete at the storage device 105 without waiting for the observer logic 150 to take any further action in response to identifying the memory access operation. Accordingly, the client logic 194 may perform a write operation to the storage volume 160 in the amount of time that the request 198 to perform the write operation travels over the interconnect 116 and the storage device 105 writes data to the memory 120. The overhead associated with storage protocols and/or writing the data to the backing store 145 may be avoided.

The client component 110 and the storage device 105 may be configured in any number ways. In one example, the storage device 105 may be included in a computer. For example, the processor 125 may be the central processing unit (CPU) of the computer, the memory 120 may be the memory of the computer, and the computer may include the communications interface 135. Alternatively or in addition, the storage device 105 may be a peripheral of a computer, including but not limited to a PCI device, a PCI-X device, a PCIe device, an HTX device, or any other type of peripheral, internally or externally connected to a computer.

In a second example, the storage device 105 may be added to a computer or another type of computing device that accesses data in the storage device 105. For example, the storage device 105 may be a device installed in a computer, where the client component 110 is a process executed by a central processing unit (CPU) of the computer. The memory 120 in the storage device 105 may be different than the memory accessed by the CPU of the computer. The processor 125 in the storage device 105 may be different than the CPU of the computer.

In a third example, the storage device 105, the client component 110, or both, may be implemented using a Non-Uniform Memory Architecture (NUMA). In NUMA, the processor 125 or 175 may comprise multiple processor cores connected together via a switched fabric of point-to-point links. The memory controller 130 or 185 may include multiple memory controllers. Each one of the memory controllers may be electrically coupled to a corresponding one of the processor cores. Each one of the multiple memory controllers may service a different portion of the memory 120 or 170 than the other memory controllers.

In a fourth example, the processor 125 of the storage device 105 may include multiple processors that are electrically coupled to the bus 165. Other components of the storage device 105, such as multiple memories included in the memory 120, the communication interface 135, the memory controller 130, and the storage controller 140 may also be electrically coupled to the bus 165.

In a fifth example, the storage system 100 may include multiple storage devices, multiple storage volumes, and/or multiple client logics. The storage system 100 may present multiple storage devices and/or storage volumes as a larger and/or faster storage volume to one or more client logics. For example, the client logic 194 may provide an interface to a respective application that facilitates the application treating the multiple storage devices and/or multiple storage volumes as fewer storage volumes than actually exist. For example, the client logic 194 may present multiple volumes on the storage device 105 and/or multiple volumes from multiple storage devices as a single storage volume to the application. The aggregation may use striping, replication, parity, partial data redundancy, any other aggregation technique known now or later discovered, or any combination of aggregation techniques.

In a sixth example, the client component 110 may provide additional services to other systems and/or devices. For example, the client component 110 may include a Network Attached Storage (NAS) appliance. Alternatively or in addition, the client component 110 may include a Redundant Array of Independent Disks (RAID) head. Alternatively or in addition, the client component 110 may provide file-level access to data stored on the storage device 105.

Alternatively or in addition, the client component 110 may provide block-level access to data stored on the storage device 105 using a storage protocol. For example, the client logic 194 may implement one or more storage protocols, such as SCSI. Thus, an application or hardware may transfer data to and from the storage device via an implementation of the storage protocol in the client logic 194. The implementation of the storage protocol may access the storage device 105 using the memory access protocol when appropriate. Alternatively or in addition, the implementation of the storage protocol may reduce interaction with the storage device 105 by, for example, returning acknowledgements to the application that may be required by the storage protocol without communicating further with the storage device 105.

In a seventh example, the client component 110 may utilize the storage device 105 as an extension of memory that is local to the client component 110 or to a computing device to which the client component 110 is coupled or included in. The additional capabilities of the storage device 105, such as low latency access and persistence to the backing store 145, may be exploited by the client component 110 to protect against application crashes, a loss of power to the client component 110, or any other erroneous or unexpected event at the client component 110. The client component 110 may provide the extension of the local memory 170 by, for example, storing application data and/or application state information in the storage volume 160 on the storage device 105. The client component 110 may be a peripheral of a computer, including but not limited to a PCI device, a PCI-X device, a PCIe device, an HTX device, or any other type of peripheral, internally or externally coupled to the computer. The client component 110 may use memory-mapped I/O to present an address space to the computer that represents one or more storage volumes that are stored on one or more storage devices, such as the volume 160 included in the storage device 105 illustrated in FIG. 1. Memory-mapped I/O facilitates accessing physical devices as addressable memory. The computer may use the presented address space as additional memory having the features of the storage device 105, such as low latency access and persistence to a backing store 145. Thus, for example, if an instance of the application or a virtual machine instance fails on a first device, the application or virtual machine may nearly instantly failover to a second device running the same application and/or same virtual machine. The application or virtual machine on the second device may proceed using the same memory used by the first device because the memory is stored in the storage device 105.

Alternatively, or in addition, the client component 110 may perform checkpoints for an application. Performing checkpoints may involve periodically storing all or a portion of the application data and/or application state onto the storage volume 160 of the storage device 105. Performing checkpoints are common in some types of applications, such as in supercomputing applications. Thus, if an instance of the application or a virtual machine fails on a first device, then the application or the virtual machine may nearly instantly failover on a second device. The application or the virtual machine may proceed starting at the last checkpoint performed.

Alternatively or in addition, multiple client components may utilize the storage device 105 as shared memory. For example, the client components may include or interoperate with an application logic that relies on massive parallelization and/or sharing of large data sets. Examples of application logic that may use massive parallelization include logic that performs protein folding, genetic algorithms, seismic analysis, or any other computationally intensive algorithm and/or iterative calculations where each result is based on a prior result. The application logic may store application data, application state, and/or checkpoint data in the storage volume 160 of the storage device 105. The additional capabilities of the storage device 105, such as low latency access and persistence to the backing store 145, may be exploited by the client components in order to protect against application crashes, a loss of power to the client components, or any other erroneous or unexpected event on any of client components. The client components may access the storage device 105 in a way that provides for atomic access. For example, the memory access operations requested by the client components may include atomic operations, including but not limited to a fetch and add operation, a compare and swap operation, or any other atomic operation now known or later discovered. An atomic operation may be a combination of operations that execute as a group or that do not execute at all. The result of performing the combination of operations may be as if no operations other than the combination of operations executed between the first and last operations of the combination of operations. Thus, the client components may safely access the storage device 105 without causing data corruption.

The client logic 194, observer logic 150, and/or the volume access logic 155 may be co-located, separated, or combined. The actions performed by combined logic may perform the same or similar feature as the aggregate of the features performed by the logics that are combined. In a first example, all three logics may be co-located in a single device. In a second example, the volume access logic 155 and observer logic 150 may be combined into a single logic. In a third example, the client logic 194 and observer logic 150 may be combined into a single logic. In a fourth example, the client logic 194 and volume access logic 155 may be combined. In a fifth example, the observer logic 150 may be in a device different from the storage device 105, such as a metadata server. A metadata server may be one or more hardware and/or software entities that may participate in the processing of operations, but may not directly handle the data stored in the storage volume 160. The metadata server may track statistics, coordinate persistence, coordinate data duplication, and/or perform any other activity related to the memory access operations.

The client logic 194, the observer logic 150, and/or the volume access logic 155 may include computer code. The computer code may include instructions executable with the processor 175 or 125. The computer code may be written in any computer language now known or later discovered, such as C, C++, C#, Java, or any combination thereof. In one example, the computer code may be firmware. Alternatively or in addition, all or a portion of the client logic 194, the observer logic 150, the volume access logic 155 and/or the processor 175 or 125 may be implemented as a circuit. For example, the circuit may include a FPGA (Field Programmable Gate Array) configured to perform the features of the client logic 194, the observer logic 150, and/or the volume access logic 155. Alternatively, or in addition, the circuit may include an ASIC (Application Specific Integrated Circuit) configured to perform the features of the client logic 194, the observer logic 150, and/or the volume access logic 155. Alternatively, or in addition, a portion of the client logic 194, observer logic 150, and/or volume access logic 155 and the processor 125 may be implemented as part of the communication interface 135 or 180 or other hardware component. For example, the communication interface 135 or 180 or other hardware component may modify a region of the memory 120 or 170 when a write operation is performed. The observer logic 150 may periodically check the region of memory and may take further action based on the contents of the region and the storage volume 160 associated with the region. The further action may include determining statistics related to the operations that are being and/or were performed, identifying regions that are being and/or have been written to and/or read from, persisting the contents of the regions to the backing store 145, duplicating the contents of the regions to a different storage volume, an external server, and/or a backup device, and/or taking any other action related to the operations.

Mechanisms for observing or identifying the operations requested by the client logic 194 and the actions taken in response to identifying the operations may take any of numerous forms. A particular mechanism may balance tradeoffs between individual operation latency, operations per second from an individual client component, aggregate operations per second from multiple client components, demand placed upon compute resources of the client component 110, and demand placed on compute resources of the storage device 105 or on the observer logic 150, among others.

Alternatively or in addition the storage system 100 may not observe or identify the memory access operations performed. Alternatively or in addition, the storage system 100 may take one or more actions without specific knowledge of the memory access operations. For example, the storage system 100 may persist the entire contents of the storage volume 160 to the backing store 145; duplicate the entire contents of the storage volume 160 to another storage device, external server, and/or backup device; and/or take some other action related to the storage volume 160. Alternatively or in addition, the storage device 105 may compare the contents of the storage volume 160 with the contents of the backing store 145. Alternatively or in addition, the storage device 105 may use computed hash values to determine which areas of the storage volume 160 have been modified. A computed hash value may be a computed output which is expected with high probability to have a different value for two different input buffers and which may be smaller than one or both input buffers. Examples of computed hash values include checksums, cyclic redundancy check codes, and cryptographic hash codes. The storage device 105 may perform actions without knowledge of the memory access operations periodically, prior to system shutdown, according to a schedule, or in response to a particular event, such as a hardware interrupt.

Figure 2:
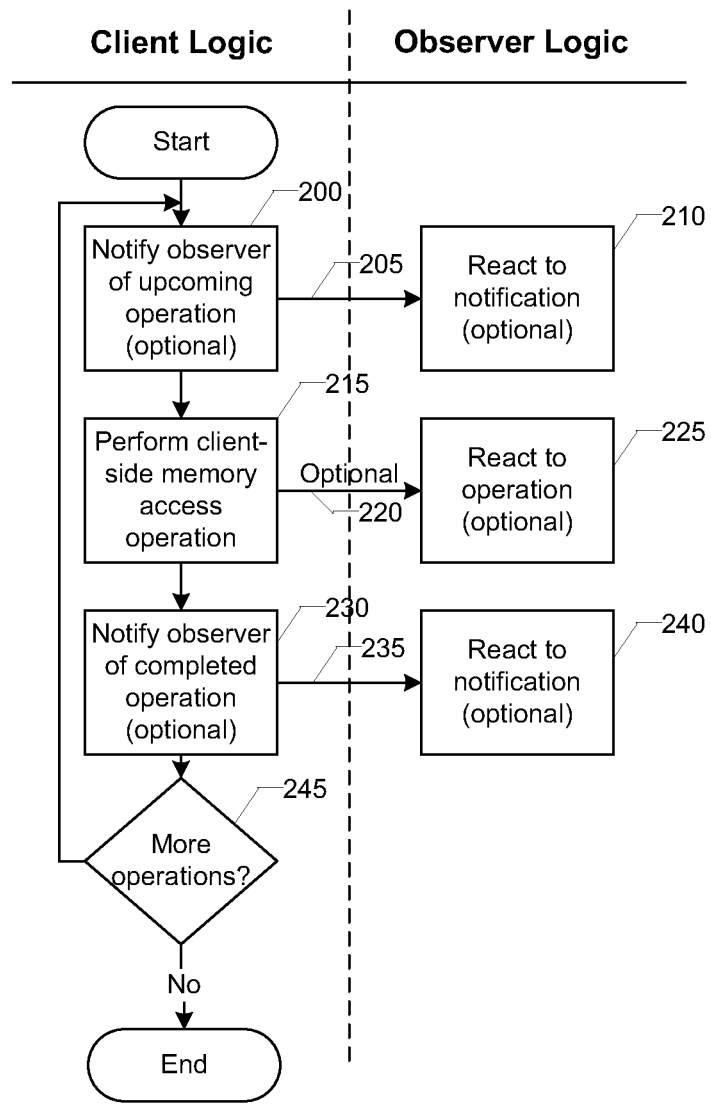
FIG. 2 illustrates a flow diagram of an example of the logic of a storage system.

FIG. 2 illustrates a flow diagram of an example of the logic of the storage system 100. In the example illustrated in FIG. 2, the client component 110 requests memory access operations and the observer logic 150 identifies the operations performed at the storage device 105. The logic of the storage system 100 may include additional, different, or fewer operations. The operations may be executed in a different order than illustrated in FIG. 2.

The client logic 194 may begin by optionally transmitting one or more notification messages to the storage device 105 (200). In response to receipt of the notification message or messages, the observer logic 150 may be notified (205) of one or more upcoming operations. The notification message or messages may indicate to the observer logic 150 or provide the observer logic 150 with, for example: a unique identifier associated with the operations, the type of operations to be performed, the storage volume 160 on which the operations are to be performed, the location within the storage volume 160 where the operations will be performed, the size of the data on which the operations will be performed, and/or other attributes of the operations to be performed.

In response to being notified (205), the observer logic 150 may react by taking one or more actions (210). An action may include, for example, aggregating statistics regarding the operations to be performed, tracking regions of the storage volume 160 that are to be written to or read from, and/or some other action related to the operations.

Alternatively or in addition, the client logic 194 may begin or continue by performing one or more client-side memory access operations (215). The client-side memory operations may optionally cause the observer logic 150 to be notified of the operations (220). For example, in performing the client-side memory operations, additional information that identifies one or more attributes of the memory access operations may be transmitted to the storage device 105 in the request 198 to perform the memory access operation.

An example client-side memory operation that may cause the observer logic 150 to be notified of the operation and/or convey some additional information is an RDMA write with immediate operation. The RDMA write with immediate operation may be executed upon a memory region associated with the storage volume 160. The immediate value specified with a RDMA write with immediate operation may convey to the storage device 105 a unique identifier associated with the operations, the type of memory access operations performed, the storage volume 160 upon which the memory access operation is performed, the location within the storage volume 160 where the memory access operation is performed, and/or the size of the data on which the memory access operation is performed. Alternatively or in addition, the immediate value may include any other attribute of the operation performed, any attribute of a different operation, or any attributes of a batch of operations.

In response to being notified (220), the observer logic 150 may take one or more actions (225). An action may include aggregating statistics about the memory access operations that are being and/or were performed, tracking regions of the storage volume 160 that that have been written to or read from, persisting the contents of the tracked regions to the backing store 145, duplicating the contents of the tracked regions to a volume in the backing store 145, an external server, and/or a backup device.

The client logic 194 may optionally continue by the client component 110 taking one or more actions (230) that cause the observer logic 150 to be notified of one or more memory access operations that completed at the storage device 105 (235). For example, the client component 110 may transmit a notification message to the storage device 105. The notification message may indicate to the observer logic 150 a unique identifier associated with the operations, the type of memory access operations that were performed, the storage volume 160 on which the memory access operations were performed, the location within the storage volume 160 on which the memory access operations were performed, the size of the data on which the memory access operations were performed, and/or some other attribute of the memory access operations that were performed.

In response to being notified (235), the observer logic 150 may take one or more actions (240). An action may include aggregating statistics about the memory access operations that are being and/or were performed, tracking regions of the storage volume 160 that that have been written to or read from, persisting the contents of the tracked regions to the backing store 145, or duplicating the contents of the tracked regions to a volume in the backing store 145, an external server, and/or a backup device.

If the client logic 194 has additional operations to perform (245), the client logic 194 may repeat by notifying the observer logic 150 of memory access operations to be subsequently performed (200) or by performing the memory access operation or operations (215). Alternatively, if no further operations are to be performed, but additional operations are expected, the client logic 194 may, in one example, wait for additional operations (215) to be ready to execute.

Actions performed and/or notifications received may aggregate information about multiple operations. Data may be aggregated based upon the type of operation performed, the storage volume 160 on which the operation(s) were performed, the region of the storage volume 160 one which the operation(s) were performed, and/or some other attribute of the operation(s).

Alternatively or in addition, actions taken by the client logic 194 before, during, or after performing the memory access operations may cause the observer logic 150 to be notified via a means distinct from, but possibly associated with, the storage device 105, the storage volume 160, or the communication interface 135. In one example, the client logic 194 may transmit a message to the observer logic 150 conveying information about a set of one or more memory access operations using a communication interface different from the communication interface 180 over which the memory access commands are transmitted and/or using a different type of communication interface. In a second example, the client logic 194 may perform a set of operations on a storage device different from the storage device 105, on the storage volume 160 and/or on a memory region that facilitates the observer logic 150 checking an area of the memory 120 in order to learn more about the operations. The area of the memory 120 that is checked may include a scratch memory region that holds information about the operations in progress.

In response to an event, such as the client component 110 disconnecting or being disconnected from the storage device 105 or a timeout expiring, the observer logic 150 may take one or more actions. For example, the action may include checking if any regions of the storage volume 160 were written to or read from, persisting the contents of the regions to the backing store 145, duplicating the contents of the regions to another storage device, external server, and/or backup device, and/or some other action related to the memory access operations.

One advantage of the storage system 100 may be that the client logic 194 may continue executing the example logic illustrated in FIG. 2 without waiting for any action or response from the observer logic 150. Alternatively or in addition, the client logic 194 may wait for an action and/or a response from the observer logic 150 before continuing to execute the example logic illustrated in FIG. 2.

The storage system 100 facilitates storing data at speeds that approach performance levels previously unachievable except by the fastest, non-persistent signaling technologies. Accordingly, applications, such as stock exchanges, databases, or any other type of application, may store data in persistent storage at speeds near the theoretical limits of the fastest networking feeds. Cluster technologies may implement safe buffer caches to swap processed data sets in and out of memory at speeds previously available only in non-persisted fashions.

Client-side memory addressable storage may facilitate creating applications that can reside concurrently, synchronously, and asynchronously on different storage media. If the application failed for some reason, the invention provides the basis to create a dynamically resilient failover or recovery to an identical application configuration on a different machine.

Multiple communication interfaces like the interface 180 in the client component 110 may be used to aggregate performance across the communication interfaces and/or to provide for failover, in the event that any of the communication interfaces or corresponding interconnects fail or otherwise become unusable. For example, the client logic 194 and/or an application in the client component 110 may dispatch requests for memory access operations across the communication interfaces and/or the corresponding interconnects by using a load-balancing mechanism. Examples of the load balancing mechanism may include round robin techniques, bandwidth balancing techniques, and/or any load balancing mechanism known now or later discovered. Alternatively or in addition, the client component 110 may use a failover mechanism when operations fail to complete successfully and/or another event occurs, such as the interconnect 115 being disconnected, a logical connection being disconnected, or any other event related to the reliability of the communication between the client component 110 and the storage device 105.

Figure 3:
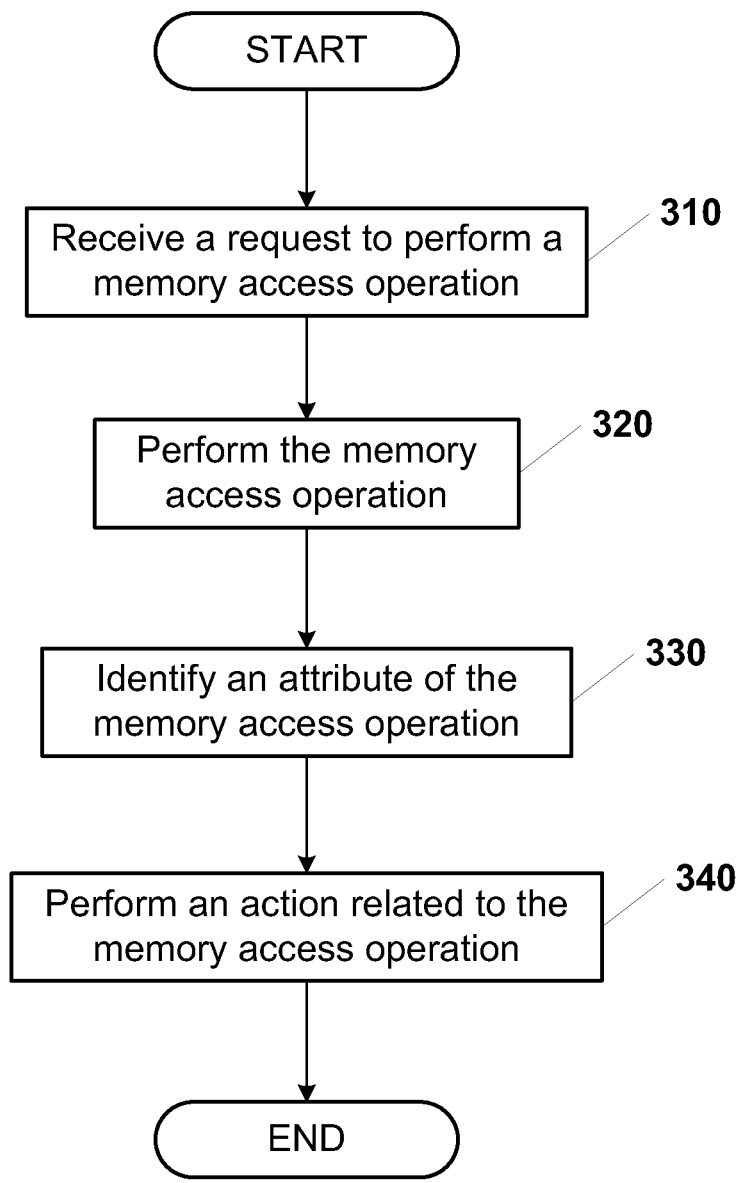
FIG. 3 illustrates a flow diagram of an example of observing memory access operations in a storage system.

FIG. 3 illustrates a flow diagram of observing memory access operations in the storage system 100. The logic may include additional, different, or fewer operations. The operations may be executed in a different order than illustrated in FIG. 3.

The request 198 to perform the memory access operation on the memory 120 of the storage device 105 may be received at the communication interface 135 of the storage device 105 (310). The request 198 may be compliant with the memory access protocol.

The memory access operation may be performed by the communication interface 135 on a portion of the memory 120 in response to the request 198 (320). The portion of the memory may be included in the storage volume 155, the entirety of which, for example, may be included in the memory 120.

One or more attributes of the memory access operation may be identified (330). For example, the observer logic 150 may determine that the portion of the memory 120 was affected by the memory access operation by receiving the notification message from the client component 110 or receiving the attribute of the memory access operation from the communication interface 135 in the storage device 105 after the communication interface 135 completes the memory access operation.

An action related to the memory access operation may be performed based on the attribute of the memory access operation (340). For example, the observer logic 150 may copy the portion of the memory 120 that was affected by the memory access operation to the backing store 145. The operations of the storage system 100 may end, for example, by listening for additional requests to perform memory access operations.

All of the discussion, regardless of the particular implementation described, is exemplary in nature, rather than limiting. For example, although selected aspects, features, or components of the implementations are depicted as being stored in memories, all or part of systems and methods consistent with the innovations may be stored on, distributed across, or read from other computer-readable storage media, for example, secondary storage devices such as hard disks, floppy disks, and CD-ROMs; or other forms of ROM or RAM either currently known or later developed. The computer-readable storage media may be non-transitory computer-readable media, which includes CD-ROMs, volatile or non-volatile memory such as ROM and RAM, or any other suitable storage device.

Furthermore, although specific components of innovations were described, methods, systems, and articles of manufacture consistent with the innovation may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program. The components may be resident on separate hardware, such as separate removable circuit boards, or share common hardware, such as a same memory and processor for implementing instructions from the memory. Programs may be parts of a single program, separate programs, or distributed across several memories and processors.

The respective logic, software or instructions for implementing the processes, methods and/or techniques discussed above may be provided on computer-readable media or memories or other tangible media, such as a cache, buffer, RAM, removable media, hard drive, other computer readable storage media, or any other tangible media or any combination thereof. The tangible media include various types of volatile and nonvolatile storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code, or any type of other processor, operating alone or in combination. Likewise, processing strategies may include multiprocessing, multitasking, parallel processing and/or any other processing strategy known now or later discovered. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

While various embodiments of the innovation have been described, it will be apparent to those of ordinary skill in the art that many more embodiments and implementations are possible within the scope of the innovation. Accordingly, the innovation is not to be restricted except in light of the attached claims and their equivalents.

What is claimed is:

1. A storage system that stores data for a client component, the system comprising:
   a communication interface including hardware for communication with the client component over an interconnect;
   a processor;
   a solid state memory configured in an address space addressable by the processor, the solid state memory including a storage volume, wherein data blocks are stored at corresponding memory locations in the storage volume; and
   a memory controller configured to perform a memory write operation on the solid state memory independently of the processor in response to a request to perform the write operation received over the communication interface, wherein the request is compliant with a memory access protocol instead of a storage protocol and includes an address of a memory location in the solid state memory at which a data block is stored in the storage volume, and the address is in the address space addressable by the processor.

2. A client component comprising:
   a communication interface including a physical communications interface for communication with a storage device, the storage device including a solid state memory for storage of data received from the client component via the communication interface, the solid state memory configured in an address space addressable by a processor of the storage device, the solid state memory including a storage volume, wherein the storage volume maps data blocks to corresponding memory locations in the solid state memory;
   a memory controller in communication with the communication interface;
   a processor in communication with the memory controller; and
   client memory comprising client logic executable with the processor to cause the memory controller to initiate, via the communication interface, a request to perform a write operation on the solid state memory of the storage device, the request compliant with a memory access protocol instead of a storage protocol, wherein the request includes an address to a memory location in the solid state memory at which the data block is stored in the storage volume, and the memory location is in the address space addressable by the processor of the storage device, wherein the write operation is performed independently of the processor of the storage device.

3. The client component of claim 2, wherein the memory access protocol is Remote Direct Memory Access (RDMA) and the communication interface includes an RDMA controller.

4. A non-transitory tangible computer-readable storage medium encoded with computer executable instructions, the computer executable instructions executable with a processor in a storage device, the computer-readable medium comprising:
   instructions executable to identify at least one attribute of a memory access operation, wherein the memory access operation is performed on a storage volume by a communication interface of the storage device independently of the processor in response to receipt by the communication interface of a request to perform the memory access operation, the storage volume is included in a memory of the storage device, the memory is in an address space addressable by the processor, the storage volume maps data blocks to corresponding memory locations in the memory of the storage device, and the request is compliant with a memory access protocol in which the corresponding memory locations in the memory are addressed instead of the data blocks; and
   instructions executable to perform an action related to the memory access operation based on the at least one attribute of the memory access operation.

5. The computer-readable storage medium of claim 4, wherein the memory access operation is a Remote Direct Memory Access (RDMA) operation.

6. The computer-readable storage medium of claim 4, wherein the instructions to identify the at least one attribute of the memory access operation are configured to execute after the memory access operation is completed.

7. The computer-readable storage medium of claim 4, wherein the request includes data indicative of the at least one attribute of the memory access operation, and the instructions executable to identify the at least one attribute of the memory access operation are executable to identify the at least one attribute from the data included in the request.

8. The computer-readable storage medium of claim 4, wherein the instructions executable to identify the at least one attribute of the memory access operation are further executable to identify the at least one attribute from a notification message received at the communication interface before the request to perform the memory access operation is received.

9. The computer-readable storage medium of claim 4, wherein the instructions executable to identify the at least one attribute of the memory access operation are further executable to identify the at least one attribute from a notification message received at the communication interface after the request to perform the memory access operation is received.

10. The computer-readable storage medium of claim 4, wherein the instructions executable to identify the at least one attribute of the memory access operation are further executable to monitor an area of the memory for data indicative of the at least one attribute, the memory access operation is a first memory access operation, and the data indicative of the at least one attribute of the first memory access operation is written to the area of the memory in response to a request to perform a second memory access operation.

11. A computer-implemented method to identify memory access operations from data received at a communication interface of a storage system, the method comprising:
   receiving a request to perform a memory access operation on a memory, the request being received at the communication interface;
   performing the memory access operation with the communication interface on a portion of the memory in response to the request, the memory access operation being performed by the communication interface independently of a processor included in the storage system, the portion of the memory being included in a storage volume, the storage volume being included in the memory, the memory being in an address space addressable by the processor, the storage volume including a map of data blocks to corresponding memory locations in the memory of the storage device, and the request being compliant with a memory access protocol in which the corresponding memory locations in the memory are addressed in the request instead of the data blocks;

identifying at least one attribute of the memory access operation with the processor; and performing an action related to the memory access operation with the processor.

12. The method of claim 11, wherein the memory access operation completes before the action related to the memory access operation is performed.

13. The method of claim 11, wherein the memory access operation completes before the at least one attribute of the memory access operation is identified.

14. A storage system that stores data for a client component, the system comprising:

a communication interface including a physical communications interface for communication with the client component;

a processor;

a solid state memory for storage of data received over the communication interface, the solid state memory configured in an address space addressable by the processor, the solid state memory including a storage volume, wherein the storage volume maps data blocks to corresponding memory locations in the solid state memory, the communication interface configured to:

receive a request to perform a memory access operation on the solid state memory, the request compliant with a memory access protocol instead of a storage protocol, wherein the request addresses a memory location of a portion of the solid state memory instead of a data block included in the data blocks corresponding to the memory locations, the portion of the solid state memory is included in the storage volume, and the memory location is in the address space addressable by the processor; and perform the memory access operation independently of the processor, in response to the request, on the portion of the solid state memory included in the storage volume; and observer logic configured to identify at least one attribute of the memory access operation and to perform an action related to the memory access operation in response to identification of the at least one attribute of the memory access operation, the communication interface being further configured to complete the memory access operation on the solid state memory without waiting for the observer logic.

15. The storage system of claim 14, wherein the solid state memory is a first memory, the storage system comprises a storage device that includes the communication interface, the first memory, and the observer logic, and wherein the memory access protocol is a communication protocol for transfer of data between a second memory included in the client component and the first memory included in a storage device, and the transfer of data is independent of central processing units (CPU) included in the client component and storage device.

16. The storage system of claim 14, wherein the solid state memory comprises, in addition to all data blocks of the storage volume, volume information about the data blocks.

17. The storage system of claim 14, wherein the action related to the memory access operation includes a determination of statistics about memory access operations.

18. The storage system of claim 14, wherein the action related to the memory access operation includes an identification of a region of the solid state memory affected by the memory access operation.

19. The storage system of claim 18, wherein the action related to the memory access operation further comprises a duplication of the region of the solid state memory to a backing store.

20. The storage system of claim 14, the solid state memory comprising the observer logic, the observer logic being executable with the processor, the communication interface being further configured to perform the memory access operation on the solid state memory independently of the processor.

* * * * *